United States Patent Office 3,420,568
Patented Jan. 7, 1969

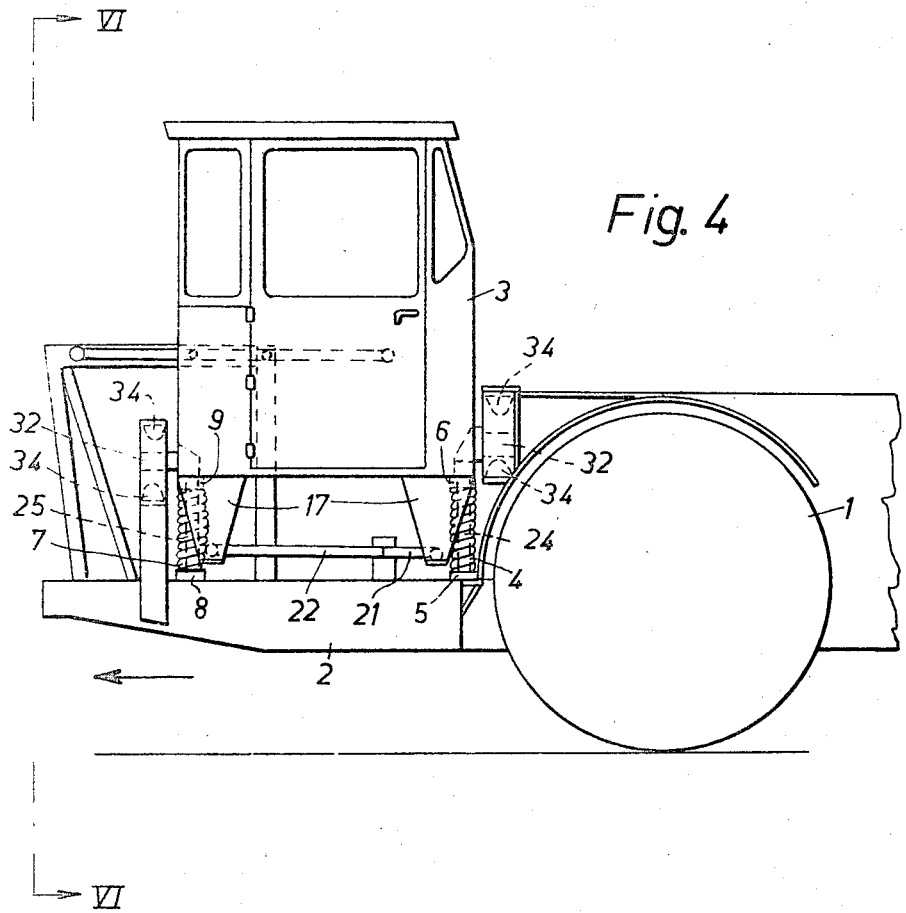

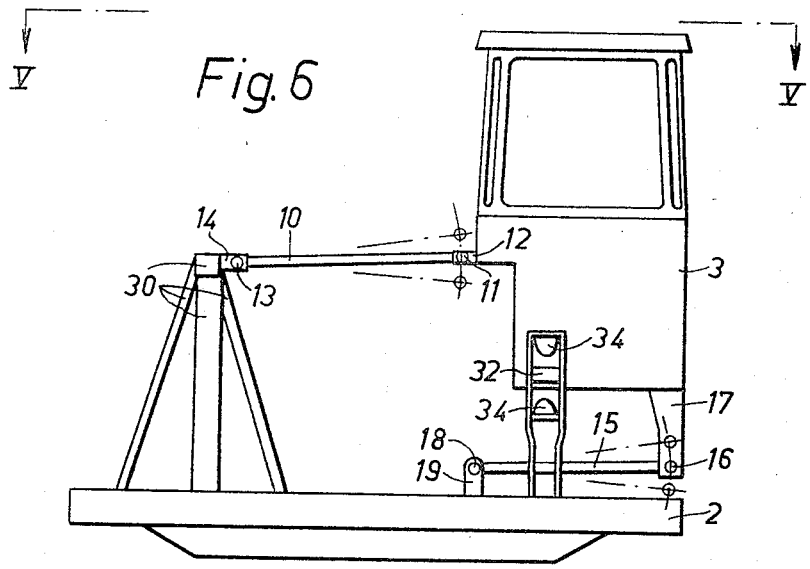
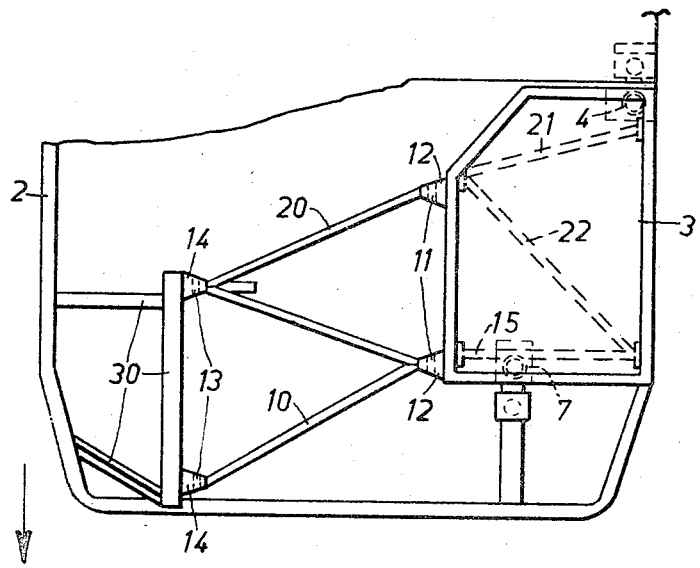

3,420,568
DEVICES FOR RESILIENT SUPPORT OF DRIVER'S COMPARTMENTS IN VEHICLES
Sune Torsten Henriksson, Lingonstigen 2, and Ragnar Ludvig Muotka, Kyrkogatan 46, both of Kiruna, Sweden
Filed Oct. 21, 1966, Ser. No. 588,363
Claims priority, application Sweden, Oct. 22, 1965, 13,704/65
U.S. Cl. 296—35
Int. Cl. B62d 23/00; B62d 21/00; B62d 27/04
5 Claims

ABSTRACT OF THE DISCLOSURE

A vehicle with a driver's compartment mounted upon the vehicle frame with resilient support means, e.g. springs, to provide vertical movement to cushion the driver against shocks absorbed by the vehicle from the earth or road, and pairs of pivotable links connected to the compartment and to the frame for guiding the compartment in its vertical movement.

---

The present invention relates to a device for resilient support of a driver's compartment in a vehicle for allowing resilient movements with great vertical amplitudes, and particularly in such vehicles the frame of which is rigid to torsional forces and non-resiliently carried by the wheels, said driver's compartment constituting by itself a completely separate unit and being connected with the vehicle frame through guide means and spring means.

In automotive vehicles, in which for various reasons such as a matter of design or operation, the supporting frame is carried from the wheels without any spring devices and, furthermore, mostly also is rigid to torsional forces, it is desirable that the shocks and impacts to which the vehicle is inevitably subjected during operation, are not transmitted to the driver.

For this purpose it has been suggested to mount resiliently the driver's seat per se, but mostly this has not given a sufficient result due to the relatively small masses which then are resiliently supported and due to the fact that the control means mostly do not participate in the resilient movements, and therefore the driver's seat and thus the driver runs the risk of being subjected to often repeated abrupt resilient movements.

Therefore, the main object of the present invention is to provide a driver's compartment of the aforementioned kind, in which the disadvantages are eliminated and a driver's place is achieved that performs calm spring movements so as to be comparable to the driver's place in an automotive vehicle with conventional spring suspension.

Other objects will be evident for those skilled in the art when reading the following description with reference to the accompanying drawings, which illustrate some preferred embodiments of the invention.

A device according to the present invention is substantially distinguished in that the guide means comprise relatively long link parallelograms providing for great spring movement amplitudes and located on opposite sides of said compartment, said parallelograms each consisting of an upper link disposed in a substantially horizontal position and extending between a wall of said compartment and a point at the vehicle frame, and a lower link extending approximately parallel to the floor of said compartment between a point at said floor at or adjacent to an edge thereof and a point at the vehicle frame.

Figure 1:
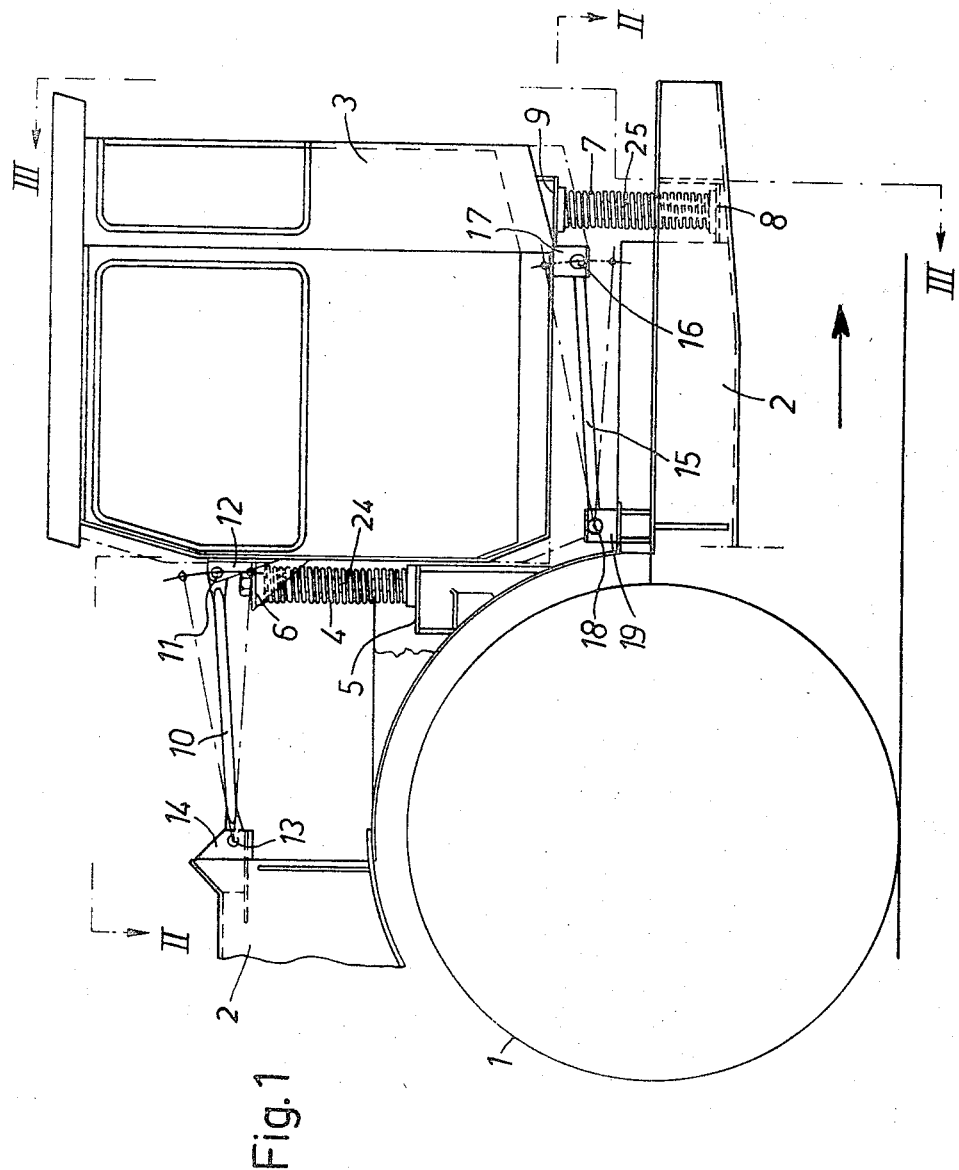
Figure 2:
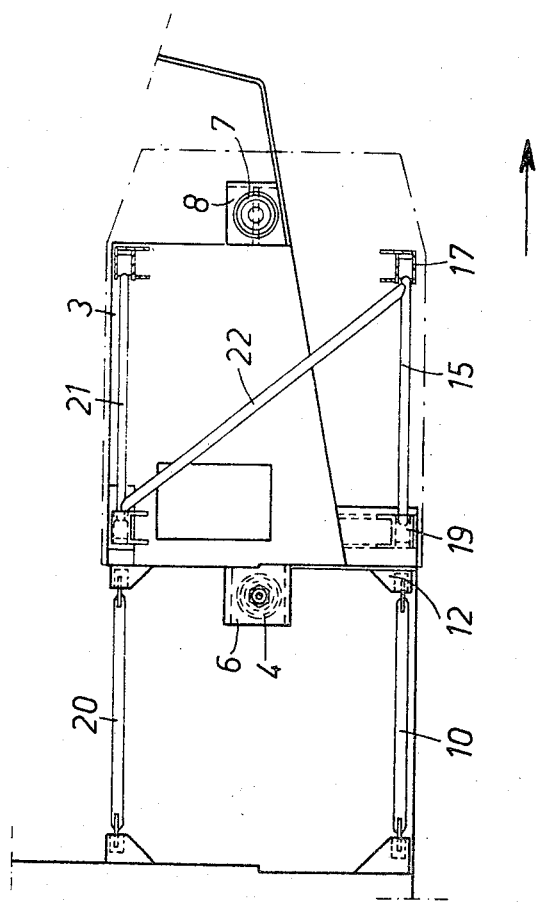
Figure 3:
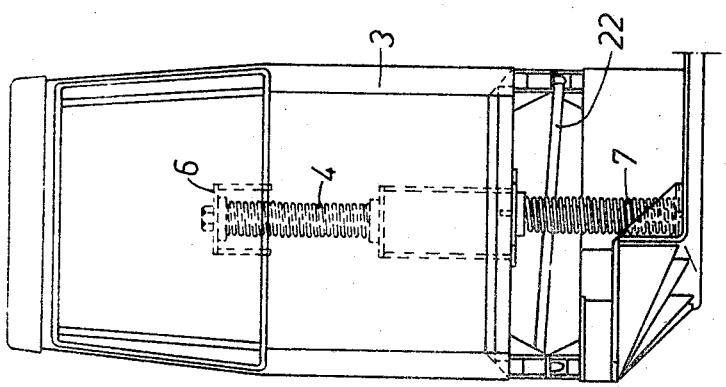

In the drawings, FIG. 1 is a diagrammatic elevational view of a driver's compartment according to the invention, with adjacent portions of the vehicle itself indicated. FIG. 2 is a diagrammatic sectional top plan view of the compartment along the line II—II of FIG. 1. FIG. 3 is a diagrammatic end view of the compartment as seen from the line III—III of FIG. 1. FIG. 4 illustrates another embodiment of the invention, with the driver's compartment being suspended at its side obliquely from the front instead of from behind, by means of a similar link parallelogram device, and FIGS. 5 and 6 are views similar to FIGS. 2 and 3, of said second embodiment.

With reference to the drawings and particularly FIG. 1, 1 designates a supporting wheel and 2 a portion of a frame of a motor vehicle, which in the present case may be for instance the propelling vehicle for a load-carrying trailer but which otherwise can be of any desired kind. Of this vehicle only those portions required for the illustration of the present invention are indicated. 3 denotes the driver's compartment which in this particular embodiment is situated at the front end of the vehicle as seen in the direction of normal travel. This compartment is built as a completely separate unit by itself which is not rigidly joined to the vehicle frame but supported thereon by spring means in the form of two upright helical springs, namely a rear spring 4 arranged between a bracket 5 on the vehicle frame and a bracket 6 on the rear wall of the driver's compartment, and a front spring 7 arranged between a cross-member 8 in the vehicle frame and a bracket 9 mounted on the bottom wall of said compartment. The springs are disposed in the longitudinal vertical centre plane of the driver's compartment. The springs are so selected as to their size and power that they provide a suitable resistance to the shocks to which the vehicle frame is subjected during operation, in order to damp their transmission to the driver's compartment, so that the resiliency thereof will be equivalent to that which the compartment would have had if the vehicle were provided with a conventional suspension.

For damping the resilient movements, there can be provided, if desired, conventional shock absorbers 24 and 25, in the illustrated embodiment being of telescope type and mounted within the helical springs 4 and 7.

For guiding the driver's compartment during the resilient movements thereof relatively to the vehicle two link parallelograms are provided on opposite sides of the compartment, the link arms of said parallelograms being of relatively great length so as to provide for great spring movement amplitudes.

In FIG. 1 is illustrated the link parallelogram mounted at one side of the compartment, and consisting of an upper, rear link 10, arranged in a normal, substantially horizontal position between a pivot pin 11 in a bracket 12 at the rear wall of the compartment and a pin 13 in a bracket 14 on the vehicle frame, and a lower front link 15, arranged between a pin 16 in a bracket 17 at the bottom of the compartment and adjacent to the front edge thereof, and a pin 18 in a bracket 19 on the vehicle frame.

A corresponding link parallelogram is located on the opposite side of the compartment and comprises an upper, rear link 20, as shown in FIG. 2, and a lower front link 21. Said pair of links 20 and 21 are arranged in the same manner as described above in connection with the links 10 and 15.

The two link parallelograms assure that the upward and downward resilient movements relatively to the vehicle become a parallel motion. In FIG. 1 the maximum end limits for the movements of the arms 10 and 15 are indicated with dotted lines. In order to fix said limits in both directions, particular stop means 32, 34 can be arranged, preferably at each end of the driver's compartment, as is shown in FIGS. 4 and 6.

In order to increase the rigidity of the link parallelograms, corresponding links of said parallelograms can be rigidly secured to each other, such as by a diagonal bar or member 22, as is shown in connection with the pair of lower links 15 and 21 in FIG. 2 (and FIG. 5, respectively).

Due to the lack of available space but also for other reasons, it can be difficult, sometimes, to arrange the parallelogram link suspension of the compartment longitudinally of the vehicle from the rear of said compartment, as illustrated in FIGS. 1–3. In some uses the resiliency can also become unfavorably apprehended by a person sitting in the compartment. In such cases, another embodiment of said suspension can be utilized where the latter is arranged to one side of the compartment, as illustrated in FIGS. 4–6.

In said figures, analogous details have the same reference numerals, and for the understanding of the idea underlying said embodiment, it ought to be sufficient to mention, therefore, that the pivot pins 13 connected with the vehicle frame and associated with the upper link arms 10, 20 are disposed on a particular support 30 to the side of the compartment 3. For practical reasons, the springs 4 and 7 are not disposed in the longitudinal centre plane in the embodiment shown although this still is possible, of course.

Other completions and modifications can be made by those skilled in art without departing from the scope of the invention as defined in the accompanying claims.

We claim:

1. In a vehicle having a frame with a driver's compartment supported on the frame by resilient support means and guide means, wherein the resilient support means are adapted to provide resilient vertical movement of the driver's compartment relative to the frame for minimizing the transmission of abrupt shocks from the frame to the driver, and the guide means include first and second pairs, respectively of upper and lower pivotable links connected to pivot points on the vehicle frame and on the driver's compartment for guiding the compartment in its vertical movement, the improvement characterized in that the links in at least one of said pairs are connected with one another by a bracing member extending between them for bracing said links against horizontal movement relative to one another.

2. A vehicle in accordance with claim 1 wherein the resilient supporting means includes a pair of springs vertically disposed between the driver's compartment and the frame at horizontally spaced positions.

3. A vehicle in accordance with claim 1 wherein the pivot points by which the ends of the links in the first pair of links are connected to the driver's compartment are horizontally spaced in relation to the pivot points by which the corresponding ends of the links in the second pair of links are connected to the driver's compartment.

4. In a vehicle having a frame with a driver's compartment which has a first pair of walls defining the front and rear of the compartment and a second pair of walls defining the sides of the compartment, said compartment being supported on the frame by resilient support means and guide means, wherein the resilient support means are adapted to provide resilient vertical movement of the driver's compartment relative to the frame for minimizing the transmission of abrupt shocks from the frame to the driver, and the guide means include first and second pairs, respectively, of upper and lower pivotable links connected to the vehicle frame and to the driver's compartment for guiding the compartment in its vertical movement, the improvement characterized in that the lower pair of links are connected to pivot points at the bottom of the driver's compartment adjacent a wall in one pair of the aforesaid pairs of walls, said links extending beneath the driver's compartment to pivot points secured to the frame, and the upper pair of links are connected to the driver's compartment adjacent the opposite wall in the aforesaid pair.

5. A vehicle in accordance with claim 4 wherein the links in at least one of said pairs of links are connected with one another by a bracing member extending between them for bracing said links against horizontal movement relative to one another.

References Cited

UNITED STATES PATENTS 454,768 6/1891 Ramsey.
1,398,810 11/1921 Story _____ 296—35 X

FOREIGN PATENTS 502,600 2/1920 France.

OTHER REFERENCES

German Printed Application DAS 1,107,526, May 1961, Winkle, 180–89.

BENJAMIN HERSH, *Primary Examiner.*

JOHN A. PEKAR, *Assistant Examiner.*

U.S. Cl. X.R.

180—89; 280—106.5